No. 797,399. PATENTED AUG. 15, 1905.
G. W. BENT.
MATTRESS TUFTING APPARATUS.
APPLICATION FILED FEB. 23, 1904.

3 SHEETS—SHEET 1.

Witnesses.
C. H. Gannett
J. Murphy

Inventor
George W. Bent
by Jas. H. Churchill
atty.

No. 797,399. PATENTED AUG. 15, 1905.
G. W. BENT.
MATTRESS TUFTING APPARATUS.
APPLICATION FILED FEB. 23, 1904.

3 SHEETS—SHEET 2.

Witnesses.
C. H. Gannett
J. Murphy

Inventor:
George W. Bent
by Jas. H. Churchill
Atty.

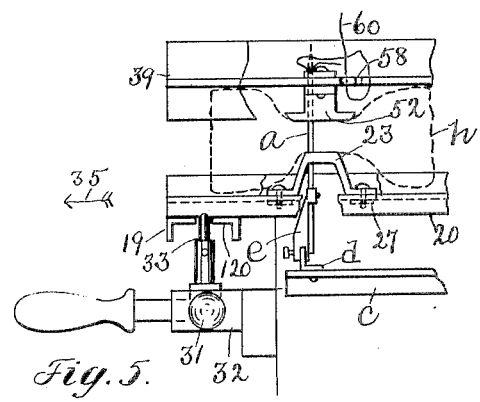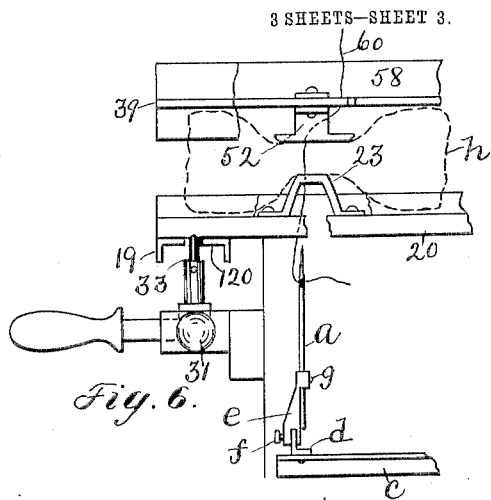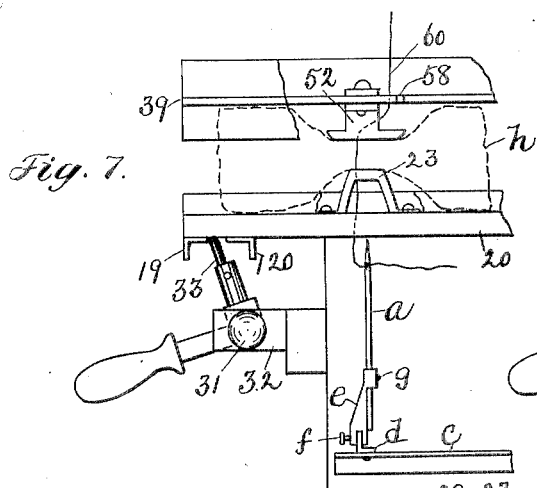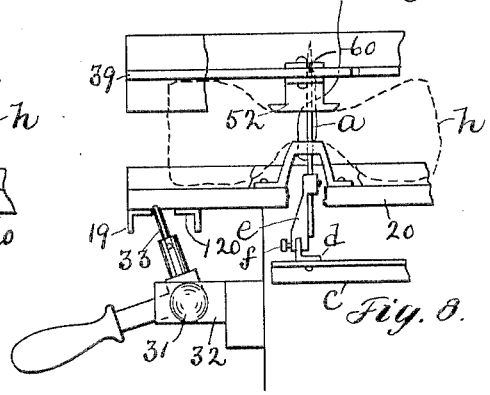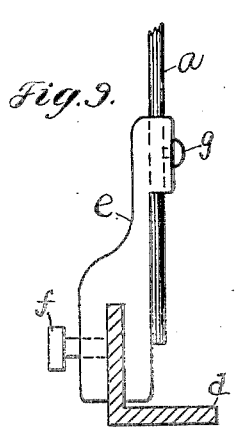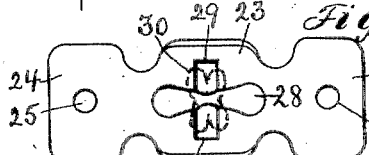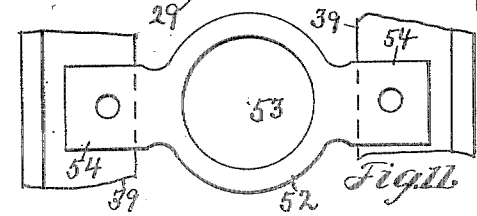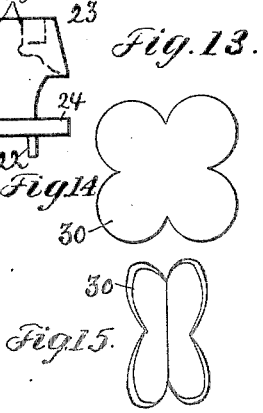

UNITED STATES PATENT OFFICE.

GEORGE W. BENT, OF HYDEPARK, MASSACHUSETTS.

MATTRESS-TUFTING APPARATUS.

No. 797,399. Specification of Letters Patent. Patented Aug. 15, 1905.

Application filed February 23, 1904. Serial No. 194,747.

*To all whom it may concern:*

Be it known that I, GEORGE W. BENT, a citizen of the United States, residing in Hydepark, in the county of Norfolk and State of Massachusetts, have invented an Improvement in Mattress-Tufting Apparatus, of which the following description, in connection with the accompanying drawings, is a specification, like characters on the drawings representing like parts.

This invention relates to an apparatus for tufting mattresses, cushions, and like articles, and has for its object to provide a simple and efficient apparatus for the purpose specified.

In accordance with this invention I employ a bed or support for the untufted mattress and a needle-carrier, one of which parts is bodily movable with relation to the other in a substantially vertical direction and in a substantially horizontal direction, and secure to said carrier a plurality of needles which are arranged at different points on said carrier, and preferably in longitudinal and transverse rows, so that the mattress may be tufted with a single needle for each tuft, the said needles penetrating the mattress on one side of the tuft and then on the opposite side thereof, as will be described.

The mattress support or bed has coöperating with it a bodily-movable clamping member, between which and said bed the mattress is firmly held while being tufted, and provision is made for quickly and easily moving said clamping member toward and away from the bed, and means are also provided for automatically securing said movable clamping member in its operative position, as will be described.

The bed and the clamping member may and preferably will be provided with compressing devices, by means of which the portions of the mattress through which the needles are passed are compressed and firmly held while said needles are being passed through the mattress. Provision is also made for securing or holding the twine or cord while it is passing through the mattress, as will be described, whereby a very considerable saving in twine may be effected, as will be described. These and other features of this invention will be pointed out in the claims at the end of this specification.

Figure 1:
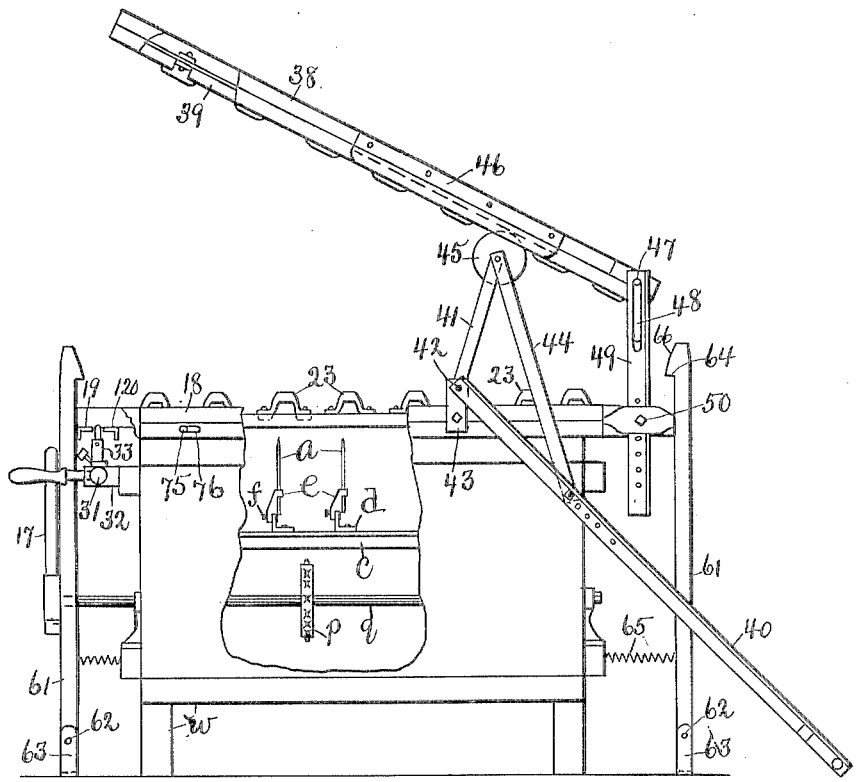
Figure 2:
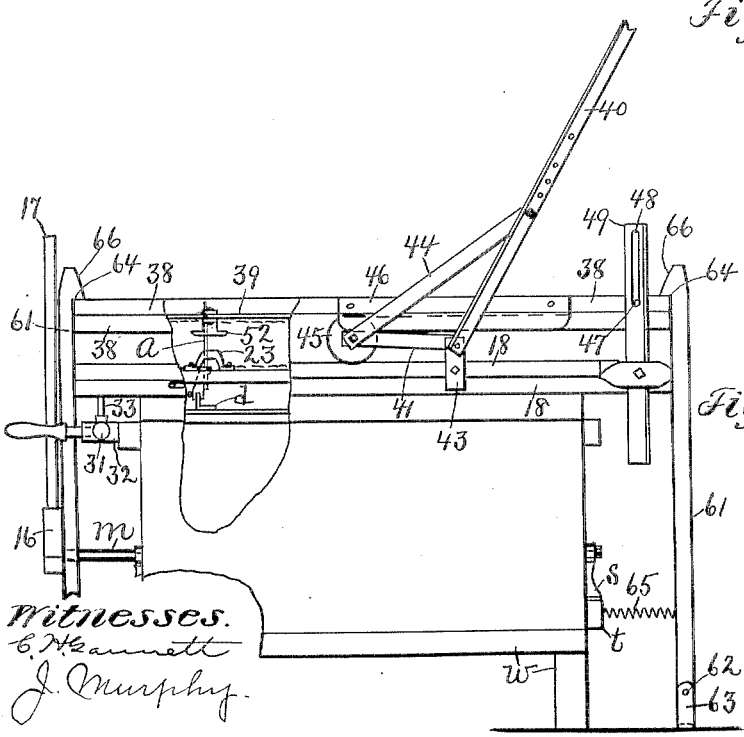
Figure 3:
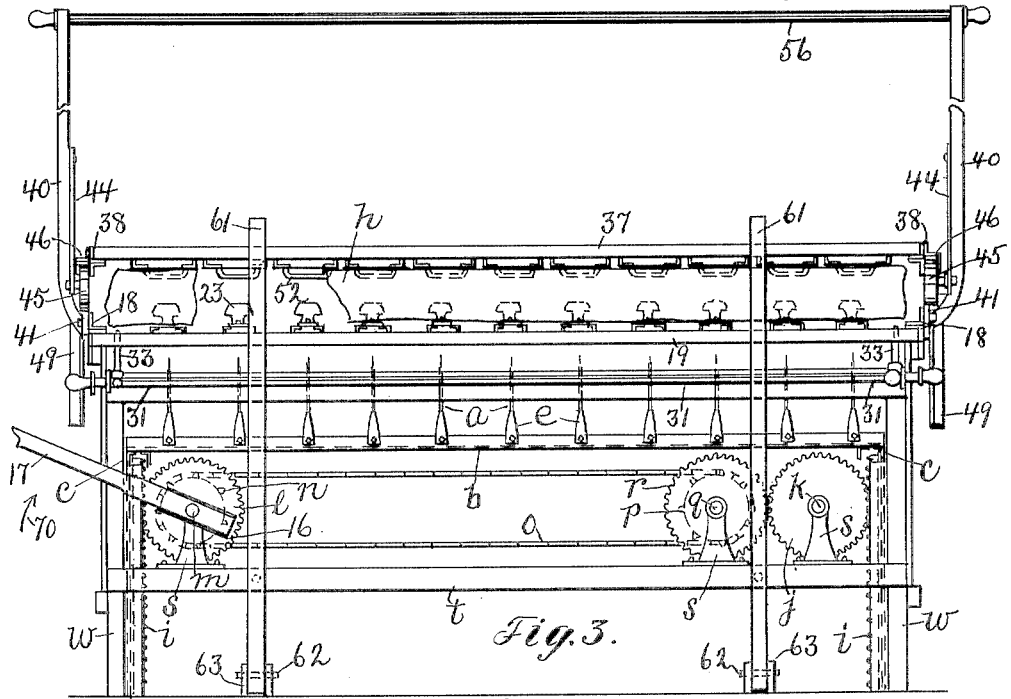
Figure 4:
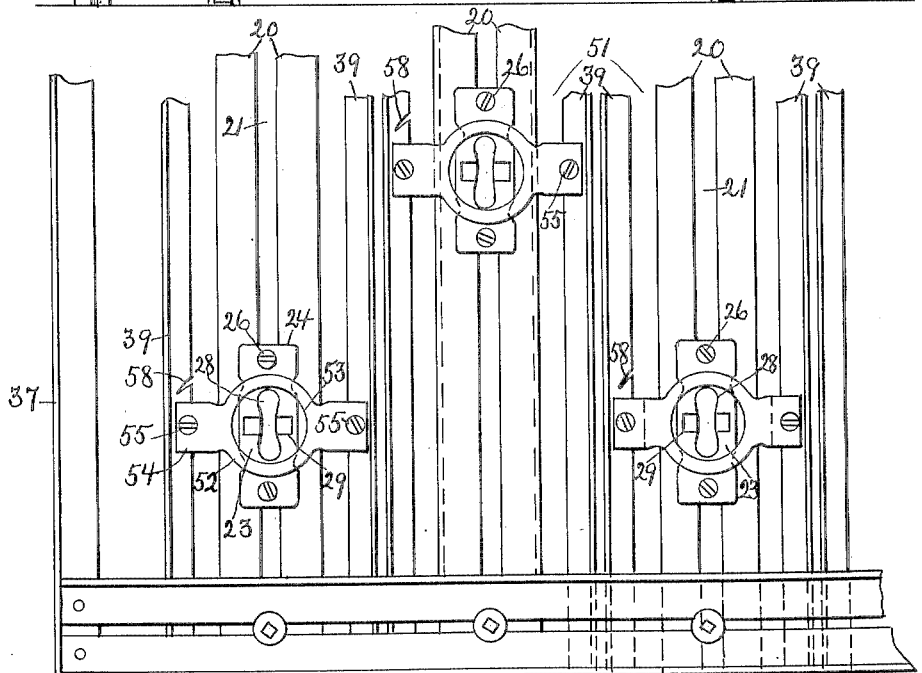

Figure 1 is an end elevation with parts broken out of a tufting apparatus embodying this invention, the clamping member being shown in its inoperative or elevated position; Fig. 2, a similar elevation with the clamping member in its operative position; Fig. 3, a side elevation of the apparatus shown in Fig. 2; Fig. 4, a detail in plan and on an enlarged scale of the bed shown in Figs. 1 and 2; Figs. 5, 6, 7, and 8, details to illustrate the operation of the apparatus shown in Figs. 1 and 2; Fig. 9, a detail of a needle and its holder; Fig. 10, a detail of one of the compressing devices affixed to the clamping member; Fig. 11, a plan of Fig. 10; Fig. 12, a plan of the compressing device secured to the bed; Fig. 13, an end elevation of the device shown in Fig. 12; Figs. 14 and 15, details of a tuft to be referred to.

In the apparatus herein shown as embodying this invention a plurality of substantially vertical needles $a$ are secured to a carrier composed of side bars $b$, end bars $c$, and intermediate longitudinally-extended bars $d$, preferably adjustably secured to the end bars $c$ to move laterally thereon. The longitudinally-extended bars $b$ $d$ have secured to them at suitable intervals needle-holders $e$, which may be adjustably secured to said bars, as by screws $f$, (see Fig. 9,) and each needle $a$ may be secured to its holder $e$ so as to be adjustable thereon in a vertical direction by a set-screw $g$, the said needles being arranged on their carrier so as to penetrate the mattress or other article $h$ to be tufted at the proper place.

In the present instance the needle-carrier is vertically movable, which may be effected, as herein shown, by means of rack-bars $i$, secured to each corner of said carrier, those rack-bars at one end of said carrier being engaged by gears $j$, mounted on a shaft $k$, and those at the other end of said carrier being engaged by gears $l$, mounted on a shaft $m$. The shaft $m$ has fast on it a sprocket-wheel $n$, which is connected by a link chain $o$ with a sprocket-wheel $p$ on a shaft $q$, provided with gears $r$, which mesh with the gears $j$, the said shafts being supported in suitable uprights $s$, secured to side bars $t$, fastened to end pieces $w$, forming a stationary frame.

The shaft $m$ is provided with a crank 16, having a handle 17, by turning which the needle-carrier may be raised and lowered with relation to a bed upon which the mattress $h$ is supported.

The bed referred to is open for the passage of the needles and may be made as herein shown, it consisting of end bars 18, side bars 19, and intermediate cross-bars 20, substantially parallel with said end bars and secured at their ends to said side bars. The side, end, and cross bars comprising the bed may be composed of angle-irons. The cross-bars 20 are arranged in pairs, as represented in Fig. 4, to leave a space 21 between each pair, into which projects guiding-ribs 22 (see Fig. 13) on the underside of a compressing device, preferably made as herein shown and composed of a substantially arch-shaped body portion 23, (see Fig. 5,) from which extend legs 24, having suitable holes 25 for the reception of screws or bolts 26, provided below the cross-bars 20 with nuts 27, by means of which the compressing device may be secured to the bed in its adjusted position. The raised body portion 23 of the compressing device is provided with a longitudinally-extended slot 28 and transverse cavities or pockets 29 on opposite sides of the said slot for the reception of the tuft 30, (shown in Fig. 14,) which is folded substantially as indicated in Fig. 15 when placed in said cavities.

The slot 28 is made materially longer than the width of the tuft 30, so that when the latter is placed in the cavities or pockets 29 ample room is left for the passage of the needle on opposite sides of the tuft, as will be described.

The bed referred to is movable bodily laterally with relation to the needle-carrier, which may be accomplished, as herein shown, by means of a rock-shaft 31, having bearings in arms 32, attached to or forming part of the stationary frame, and provided near its opposite ends with upright cranks or arms 33, which engage the bed, and, as herein shown, said cranks extend up into a space between two angle-irons 19, 120, constituting a side bar of the bed. The cranks 33 are made long enough so that when the shaft 31 is rocked in one direction the said cranks will engage the angle-iron 19 and move the bed in the direction indicated by the arrow 35, Fig. 5, and into the position represented in Figs. 7 and 8, and when rocked in the opposite direction the cranks will engage the angle-iron 120 and move the bed in the direction opposite to that indicated by the arrow 35 and back into the position shown in Figs. 5 and 6. These movements of the bed position a tuft 30 with relation to a needle $a$ so that the needle penetrates the mattress on opposite sides of the tuft, as will be more fully described.

The bed has coöperating with it a clamping member for the mattress $h$, which member may be made as herein shown, and consists of side, end, and cross bars 37 38 39, suitably secured together and preferably composed of angle-irons. The clamp may and preferably will be bodily movable with relation to the bed, and for this purpose I employ at each end of the bed an elbow-lever comprising the long arm 40 (see Fig. 1) and the short arm 41, both mounted on a pivot 42, supported by a lug 43, attached to the bed, the said arms being connected by a tie-bar 44, which is adjustably secured to the long arm 40, so as to vary the angle of the short arm 41 to said long arm. The short arm 41 carries a roller 45, which is adapted to engage a track-piece 46, fastened to the end bar of the clamp. The clamping member is guided in its vertical movement by pins 47, extended into slots 48 in uprights 49, which are adjustably secured, as by bolts 50, to the bed, so that the clamping member may be adjusted with relation to the bed according to the thickness of the mattress. The cross-bars 39 of the clamping member may be made of angle-iron (see Fig. 4) and arranged in pairs to leave a space 51 between them, which is bridged at intervals by compressing devices, each of which, as shown, is provided with a substantially arch-shaped center portion 52, (see Fig. 10,) provided with an opening 53 and with slotted arms 54, which are adapted to embrace the horizontal portion of the angle-irons 39, as shown in Fig. 10, and are adjustable on said angle-irons, said compressing devices being secured in their adjusted position by set-screws 55.

In practice the compressing devices are secured to the bed and its coöperating clamping member, so that when the compressing member is in its closed or operative position the said compressing devices are substantially in line with each other, as represented in Figs. 5 to 8, inclusive The levers 40 may be connected together by a cross bar or rod 56, which forms a handle by means of which the clamping member may be raised and lowered by the operator. The angle-irons 39 may be provided with notches or slits 58, (see Fig. 4,) by means of which the free end of a continuous twine or cord 60 may be rendered fast during the tufting operation. The cord 60 for each needle may be taken from a ball, (not shown,) but which may be suitably supported above the apparatus.

Provision is made for holding the clamping member in its lowered or operative position, and for this purpose I have provided on opposite sides of the apparatus automatic catches, herein shown as upright levers 61, pivoted at their lower ends, as at 62, to stationary supports 63 and having their upper ends extended up above the bed a sufficient distance to insure the hooked ends 64 of said levers engaging the upper surface of the clamping member. The levers 61 are normally drawn in against the sides of the bed by springs 65, and the upper ends of said levers may and preferably will be provided with inclined or cam-shaped inner surfaces 66, which are adapted to be engaged by the under surface of the sides of the clamping member when the latter is lowered from the position shown in Fig. 1 into that shown in Figs. 2 and 3, the said levers being forced backward against the action of the springs until the sides of the clamping member have cleared the latch or catch 64, whereupon the springs 65 draw the levers inward, so as to place the catches 64 above the upper edge of the sides of the clamping member, as represented in Fig. 2.

The method of tufting mattresses with the apparatus herein shown may be briefly described as follows: Assume the parts of the apparatus to be in the position represented in Fig. 1. The operator folds the substantially flat tuft shown in Fig. 14 into the position substantially shown in Fig. 15 and inserts a tuft into the cavities 29 in each compressing device 23 attached to the bed. The mattress h is then placed upon the bed and the clamping member is lowered to secure the mattress between it and the bed, the portions of the mattress in line with the compressing devices 23 52 being compressed and firmly held, as represented by the dotted lines in Figs. 5 and 8, inclusive, so as to facilitate the passage of the needles through the mattress. The parts are now in the position represented in Fig. 3, with the needles in their lowered position. The operator turns the handle 17 in the direction indicated by the arrow 70 to elevate the needle-carrier, and thereby cause each needle to pass up through the slot 28 on one side of the tuft 30 in a compressing device 23, through the mattress and through the opening in a compressor 52 until the needle has been projected above the clamping member a sufficient distance to permit it to be threaded, which position is represented in Fig. 5. The operator inserts the cord or twine 60 into the eye of each needle, leaving a short length of twine free. The handle 17 is then turned back into the position represented in Fig. 3, so as to lower the needles and withdraw them from the mattress. Each individual needle on its downward movement carries with it the cord or twine in its eye, as represented in Fig. 6, and when the needle-carrier and its needles have been lowered into the starting position (represented in Figs. 3 and 6) the bed and its clamp are moved laterally with relation to the path of the needles by turning the rock-shaft 31 from the position shown in Figs. 5 and 6 to that shown in Figs. 7 and 8. This lateral movement of the bed places the other end of the slot 28 in the compressing device 23 in the path of movement of the needle, and thereafter the operator again turns the handle 17 in the direction indicated by the arrow 70, so as to carry the needles up through the end of the slot 28 on the other side of the tuft in the cavity 29 and into the position represented in Fig. 8. It will be observed that on the upward movement of each needle a loop is formed about the tuft in the cavity of the compressing device 23, and the portion of the loop above the mattress may then be withdrawn from the eye of the needle and tied to the continuous portion of the string or cord, after which the continuous cord may be cut in close proximity to the top of the mattress and the handle 17 turned back into its starting position to withdraw the needles from the tufted mattress, the free end of the twine or cord being placed in the notch 58 to hold the same in convenient position to the needles. An operator on each side of the machine then draws back the catch-levers 64, so as to disengage the catches from the clamping member, after which the latter is elevated into the position shown in Fig. 1 by turning down the handle 56, thereby leaving ample space for the tufted mattress to be removed from the apparatus. The bed is moved back into its starting position (represented in Fig. 5) by turning the rock-shaft 31 so as to engage the cranks or arms 33 with the angle-iron 120, and on the continued movement of the rock-shaft after such engagement the bed is moved laterally, the extent of movement being determined by suitable stops, herein shown as pins 75, (see Fig. 1,) projecting from the ends of the stationary frame into slots 76 in the end bars 38 of the bed, as represented in Fig. 1. The apparatus is thus restored to its starting position, whereupon a new or untufted mattress may be placed upon the bed and the operation above described repeated.

In the present instance I have shown the invention embodied in an apparatus in which the needle-carrier is bodily movable in a vertical direction and the bed is bodily movable laterally with relation to the needles, and while I may prefer this construction I do not desire to limit my invention in this respect. So, also, I have shown the needle-carrier as manually operated; but I do not desire to limit my invention in this respect. I have herein shown one construction of apparatus as embodying the invention; but I do not desire to limit the invention to the particular construction shown. I have herein described the cord or twine as taken from a continuous cord or ball; but I do not desire to limit my invention in this respect, as a predetermined length of cord may be used with each needle.

From the above description it will be seen that a single needle is employed for each tuft and that all the needles penetrate the mattress simultaneously, or substantially so, at the points where it is desired to tuft the mattress. The single needles form loops of the tufting twine or thread by reason of the lateral movement of the needles or mattress one with relation to the other. As a result of this construction and method of operation the mattress may be tufted in a minimum time without disturbing the filling of the same, and thereby avoiding displacement of the filling, which would render the mattress of uneven thickness and defective in this respect. So, also, the apparatus can be operated with a minimum power, owing to the fact that a single needle carrying one strand or piece of twine for each tuft can be forced through the mattress with materially less power than when two needles are employed for each tuft and each carrying a piece or strand of twine. Furthermore, the resistance offered to the passage of a single needle and its twine for each tuft is diminished to such extent as to insure the needles passing through the mattress in a straight path or line, thereby avoiding bending of the needles and insuring proper tufting of the mattress. So, also, a material saving in needles and twine is effected by the use of a single needle for each tuft.

I claim—

1. In an apparatus of the character described, in combination, a bed or support for the mattress, a plurality of rows of needles coöperating therewith, a common carrier to which all of said needles are secured, means for moving said common needle-carrier toward and from the said bed or support, and means for moving said bed or support laterally with relation to the path of movement of the needles, substantially as and for the purpose specified.

2. In an apparatus of the character described, a bed or support for the mattress provided on its upper surface with a plurality of compressing devices having a cavity for the reception of a tuft and provided with a slot extended substantially at right angles to the said cavity, a clamping member coöperating with the said bed to secure the mattress in operative position on said bed and provided on its lower surface with a plurality of compressing devices coöperating with the compressing devices secured to the bed, means to secure said clamping member to said bed in its closed or operative position, a plurality of needles, a common carrier to which all of said needles are secured, means to move said carrier toward and from the said bed, and means to move the bed and its clamping member laterally with relation to the path of movement of the said needles, substantially as and for the purpose specified.

3. In an apparatus of the character described, in combination, a bed or support for the mattress and a needle-carrier comprising side, end and intermediate bars, one of said parts being bodily movable with relation to the other in a substantially vertical plane and the other of said parts being bodily movable laterally, and a plurality of rows of needles rigidly secured to the intermediate bars of said carrier, substantially as described.

4. In an apparatus of the character described, in combination, a bed or support for the mattress and a needle-carrier, comprising side, end, and intermediate bars one of said parts being bodily movable with relation to the other, a plurality of rows of needles rigidly secured to the bars of said carrier, and means for effecting bodily movement of the bed laterally with relation to the needles, substantially as described.

5. In an apparatus of the character described, in combination, a bed or support for the mattress and a needle-carrier, one of said parts being bodily movable laterally with relation to the other, and a plurality of rows of needles rigidly secured to said carrier, substantially as described.

6. In an apparatus of the character described, in combination, a bed or support for the mattress, a clamping device or member bodily movable toward and from said bed or support, means to raise said clamping member away from said bed, said means comprising levers 40, 41 and brace-bars 44, and a handle 56 connecting the levers 40, substantially as described.

7. In an apparatus of the character described, in combination, a bed or support for the mattress, compressing devices secured to said bed or support and each provided with a cavity for the reception of a tuft and a slot extended substantially at right angles to and beyond said cavity for the passage of a needle on opposite sides of said tuft, a clamping member coöperating with said bed, compressing devices secured to said clamping member and coöperating with the compressing devices on said bed, a common needle-carrier, a plurality of needles rigidly secured thereto, means to move said carrier to cause all the needles to penetrate the mattress held between said compressing devices, and means to move said bed and clamping member laterally with relation to the path of movement of said needles, substantially as described.

8. In an apparatus of the class described, in combination, a bed or support for the mattress, a clamping member coöperating therewith, a substantially horizontal rock-shaft, substantially vertical cranks or arms on said rock-shaft in engagement with said bed and a handle attached to said rock-shaft to enable the said shaft to be rocked to effect bodily movement of said bed and clamping member, substantially as described.

9. In an apparatus of the class described, in combination, a bed or support for the mattress, and a common needle-carrier, a plurality of rows of needles rigidly attached to said common carrier, means to effect bodily movement of one of said parts laterally with relation to the other, and means to effect bodily movement of one of said parts in a direction substantially at right angles to said lateral movement, substantially as described.

10. The combination in a tufting-machine, of compression members for the mattress, each comprising a frame and a plurality of projections provided with openings, the said projections extending from opposing surfaces of said frames, one of said frames being movable toward and from the other, a plurality of rows of needles arranged to be passed through the openings in said projections, and means for producing a relative movement laterally between said compressing members and needles, substantially as described.

11. In an apparatus of the class described, in combination, a bed or support for the mattress, a plurality of rows of needles, one for each tuft of the completed mattress, coöperating with said support and arranged to penetrate the mattress at the points where it is to be tufted by bodily movement of one of said parts toward the other, means to effect said bodily movement, and means to effect movement of one of said parts laterally with relation to the other, for the purpose specified.

12. In an apparatus of the character described, in combination, a bed or support for the mattress, a common needle-carrier, one of said parts being bodily movable with relation to the other in a substantially vertical plane, and one of said parts being bodily movable laterally with relation to the other, and a plurality of rows of needles, one for each tuft of the completed mattress, secured to said common carrier, substantially as and for the purpose specified.

13. In an apparatus of the class described, in combination, a bed or support upon which the mattress is placed, a plurality of rows of needles coöperating with said bed and arranged to penetrate the mattress at the different points over its surfaces where it is to be tufted, one of said parts being bodily movable laterally with relation to the other, and one of said parts being bodily movable substantially at right angles to said lateral movement, and means to clamp the mattress on its bed or support against movement thereon and to compress the same at the points where it is to be tufted, substantially as described.

14. The combination in a tufting-machine, of a bed or support for the mattress, a plurality of compressing devices secured to said bed or support and arranged in rows over the surface thereof at the points where the mattress is to be tufted, a clamping member coöperating with said bed to firmly hold the mattress on said bed against movement thereon, a plurality of compressing devices secured to said clamping member and arranged in rows over the surface thereof to register with the compressing devices of the bed and thereby firmly compress the mattress on its opposite surfaces at the points where it is to be tufted, and a plurality of rows of needles one for each tuft coöperating with said bed or support and arranged to penetrate the mattress at the points under compression, substantially as described.

In testimony whereof I have signed my name to this specification in the presence of two subscribing witnesses.

GEORGE W. BENT.

Witnesses:
JAS. H. CHURCHILL,
J. MURPHY.